United States Patent

[11] 3,548,758

| [72] | Inventor | Roy E. Singer |
| | | Minneapolis, Minn. |
| [21] | Appl. No. | 761,100 |
| [22] | Filed | Sept. 20, 1968 |
| [45] | Patented | Dec. 22, 1970 |
| [73] | Assignee | General Mills, Inc. |
| | | a corporation of Delaware |

[54] DOUGH SLITTER
3 Claims, 3 Drawing Figs.

[52] U.S. Cl. .................................................. 107/69, 83/429
[51] Int. Cl. ....................................................... A21c 11/12
[50] Field of Search .......................................... 107/8, 4(.3), 12, 68, 69, 70; 83/429

[56] References Cited
UNITED STATES PATENTS

| 918,427 | 4/1909 | Ellis | 83/429 |
| 1,319,189 | 10/1919 | Taggart | 107/8 |
| 1,680,779 | 8/1928 | Freeman | 107/8 |
| 1,874,173 | 8/1932 | Davis | 83/429X |
| 2,232,832 | 2/1941 | Walborn | 107/68 |
| 2,434,339 | 1/1948 | Stiles | 107/68X |
| 2,454,316 | 11/1948 | Haecks | 107/12X |
| 2,465,670 | 3/1949 | Urschel et al. | 107/69X |
| 2,858,776 | 11/1958 | Temple | 107/8 |
| 2,938,474 | 5/1960 | Filler | 107/69 |
| 3,318,266 | 5/1967 | Rich et al. | 107/8X |

Primary Examiner—Walter A. Scheel
Assistant Examiner—Arthur O. Henderson
Attorneys—Anthony A. Juettner, William C. Babcock and Kenneth D. Ohm ABSTRACT: A number of circular cutting blades are mounted on a single shaft. These cutting blades are positioned to pass through the dough sheet they are slitting. The cutting blades are rotated so the speed of their peripheral edges exceeds the linear speed of such dough sheet. The portion of the dough sheet being slit is kept in tension by rollers which are positively driven.

PATENTED DEC 22 1970

3,548,758

INVENTOR.
ROY E. SINGER
BY Kenneth D. Ohm
ATTORNEY

DOUGH SLITTER

The present invention relates to an apparatus for slitting a sheet of dough. More particularly, it pertains to a dough slitter having a ganged set of rotary cutting blades which are positively driven at a peripheral speed greater than the linear speed of the sheet of dough such blades are slitting.

In the manufacture of a number of food products dough is conventionally formed as a wad or slab. Thereafter, the dough is sheeted and the sheet cut into narrow parallel strips which are thereafter further processed.

One object of the present invention is to provide an apparatus for facilitating the cutting of such dough sheets into narrow parallel strips of predetermined width.

Another object of the present invention is to provide an apparatus for the cutting of either sticky or tough doughs into narrow parallel strips while minimizing any tendency of such dough to adhere to the cutting mechanism.

Other objects and advantages of this invention will be apparent from the following description in which certain preferred embodiments of the invention are disclosed.

In the drawings which form a part of this application:

Figure 2:
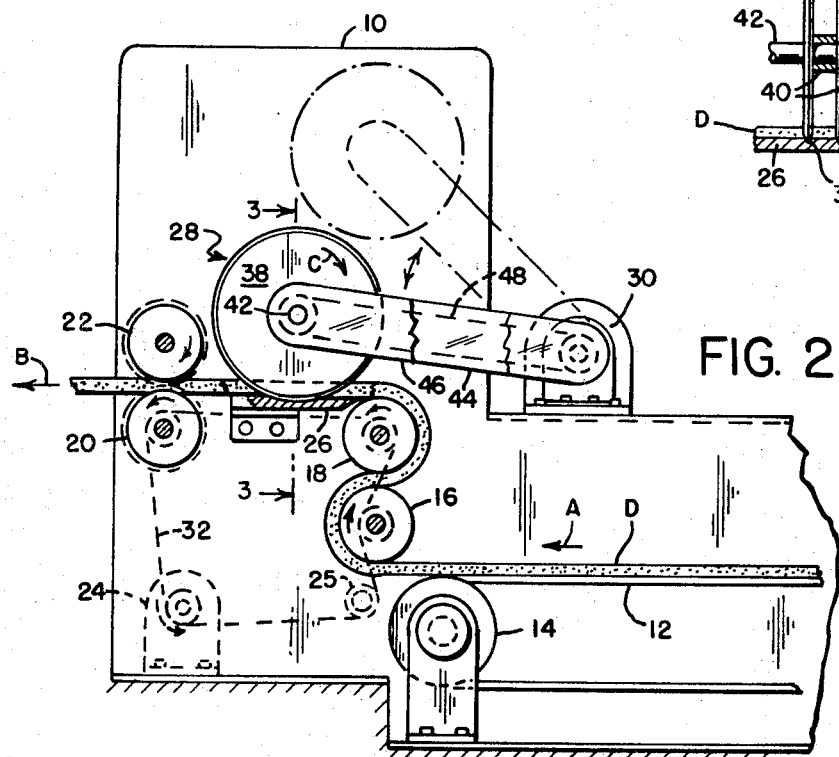
FIG. 2 is a partial cross-sectional view of a portion of the apparatus shown in FIG. 1 taken along line 2-2 and looking in the direction indicated by the arrows.
Figure 1:
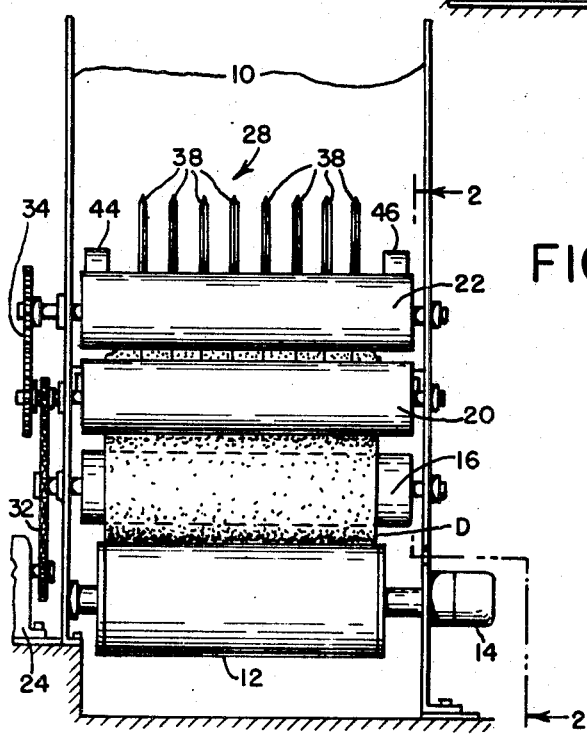
FIG. 1 is a front view of an apparatus constructed in accordance with the present invention.

Referring now to FIGS. 1 and 2, one embodiment of a dough slitting apparatus embodying the present invention comprises a frame 10, a conveyor 12 (shown in part) mounted on the frame, a conveyor motor 14 mounted on the frame, a pair of drive rollers 16 and 18 rotatably journaled in the frame, a pair of tension-applying rollers 20 and 22 rotatably journaled in the frame, a second motor 24 mounted on the frame, an idler sprocket 25 rotatably mounted on the frame, a cutting plate 26 mounted on the frame, a rotary cutter 28 pivotally mounted on the frame, and a third motor 30 mounted on the frame.

The rollers 16, 18, and 20 are positively driven in the directions indicated by the arrows on such respective rollers by a chain 32 connected to the output of the motor 24. The roller 22 is driven by gearing 34 connecting it to roller 20.

Figure 3:
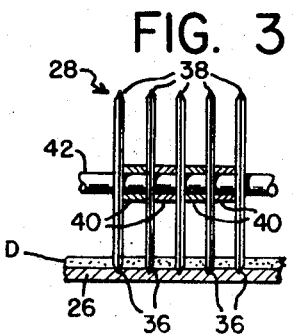
FIG. 3 is a partial cross-sectional view of a portion of the apparatus shown in FIG. 2 taken along line 3-3 and looking in the direction indicated by the arrows.

The cutting plate 26 may be made of a relatively frictionless material, such as nylon or the like. As shown in FIG. 3, the cutting plate 26 has a series of slits 36 therein.

Positioned above the cutting plate 26 is the rotary cutter 28 comprised of a plurality of cutting elements shown as circular cutting discs 38 and spacers 40 mounted on a shaft 42. The spacers 40 help keep the discs 38 a proper distance apart for the formation of uncooked dough strips of a desired predetermined width. The discs 38 are of identical diameter, and are similarly positioned on the shaft so the centers and the peripheries of the discs are parallel to the longitudinal axis of the shaft 42. The cutting discs 38 may be made of a strong durable material, such as chrome vanadium steel. The cutting discs 38 and the spacers 40 are mounted on the shaft 42 so as to rotate with such shaft about its axis.

The shaft 42 is rotatably journaled in a pair of arms 44 and 46 which are pivotally mounted on the frame 10. Also mounted on the frame 10 is the motor 30 which drives the cutting discs 38 by means of a chain 48. The cutting discs 38 can be moved away from the cutting plate 26, i.e., their position shown in solid lines, to a position shown by the dash-dot lines in FIG. 2.

In operation, a continuous sheet of dough D is carried by the conveyor 12 at a first rate of speed in the direction shown by an arrow A. When the sheet of dough D reaches the end of the conveyor 12, it is moved upwardly by the rollers 16 and 18 at substantially the same linear speed it moves along the conveyor 12 to the upper surface of the cutting plate 26. The sheet of dough D moves across the cutting plate 26 at substantially the same linear speed it was moved by the rollers 16 and 18 to the tension rollers 20 and 22. The peripheral edges of the tension rollers 20 and 22 rotate at a linear speed slightly greater than the linear speed of the conveyor 12 in order to place tension on the dough D as it moves across the cutting plate 26 away from the cutting discs 38 in the direction shown by an arrow B.

As the sheet of dough D moves across the cutting plate 26, each of the cutting discs 38 is positioned as shown in the solid lines of FIG. 2 so it penetrates through the entire thickness of the sheet of dough D and into its respective mating slit 36 in the cutting plate 26 (see FIG. 3). In this regard it is noted that each of the slits 36 is as shallow and narrow as it can be and still permit penetration thereof by its mating disc 38. The cutting discs 38 rotate in the direction shown by the arrow C, i.e., with the peripheral edge of each of the cutting discs moving in the same direction as the linear movement of the sheet of dough D. The cutting discs 38 rotate so their peripheral speed is greater than the linear speed of the sheet of dough D as such sheet passes across the cutting plate 26. It has been found that if the linear speed of the peripheral edges of the cutting discs 38 is 75 times greater than the linear speed of the sheet of dough D that such cutting discs cleanly slit the dough and at the same time do not have any of the dough adhere to the discs. The speed of the peripheral edges of the discs 38 can vary from approximately between 10 to 200 times greater than the linear speed of the sheet of dough depending upon the consistency of the dough. Preferably, the speed of the peripheral edges of the discs varies from between 70 to 80 times greater than the linear speed of the sheet of dough. In any case, it is extremely important that the speed of the peripheral edges of the discs 38 exceeds the linear speed of the dough sheet D. After the dough sheet D is slit into narrow strips by the discs 38, the strips are pulled away from the slitting area by the rollers 20 and 22 provided for that purpose.

In view of the principles set forth herein, I have shown some of the ways of carrying out the present invention and some of the equivalents which are suggested by these disclosures.

I claim:

1. An apparatus for slitting a sheet of dough into strips of predetermined width comprising a plurality of spaced radially extending cutting elements adapted for rotation about a single axis, means for continuously moving a sheet of dough material into contact with said plurality of elements, means for keeping the portion of said sheet in tension while said portion is in contact with said cutting elements, and means for rotating said cutting elements so the peripheral speed of the cutting edge of such elements exceeds the linear speed of the sheet of dough delivered into contact with said plurality of cutting elements.

2. An apparatus for slitting a sheet of dough into strips of predetermined width as called for in claim 1 wherein said means for keeping the portion of said sheet in tension while said portion is in contact with said cutting elements includes means for pulling the strips formed from said sheet away from the area in which said sheet comes in contact with said cutting elements.

3. An apparatus for slitting a sheet of dough into strips of predetermined width as called for in claim 2 wherein said means for keeping the portion of said sheet in tension while said portion is in contact with said cutting elements includes tension roller means for engaging both sides of said sheet as said sheet is fed into contact with said cutting elements, and wherein said means for pulling said strips includes tension roller means for engaging both sides of said strips to pull said strips away from the area in which said sheet comes into contact with said cutting elements.